United States Patent
Vollmer et al.

(10) Patent No.: US 11,657,327 B2
(45) Date of Patent: *May 23, 2023

(54) STATIONARY CLASSIFIER FOR GEOGRAPHIC ROUTE TRACE DATA

(71) Applicant: Mapbox, Inc., Washington, DC (US)

(72) Inventors: Ugo Vollmer, San Francisco, CA (US); Laurier Rochon, Montreal (CA)

(73) Assignee: MAPBOX, INC., Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/410,968

(22) Filed: Aug. 24, 2021

(65) Prior Publication Data

US 2021/0383278 A1 Dec. 9, 2021

Related U.S. Application Data

(63) Continuation of application No. 16/010,238, filed on Jun. 15, 2018, now Pat. No. 11,126,928.

(51) Int. Cl.
*G06N 20/00* (2019.01)
*H04L 67/54* (2022.01)
*G01S 19/13* (2010.01)

(52) U.S. Cl.
CPC ............. *G06N 20/00* (2019.01); *H04L 67/54* (2022.05); *G01S 19/13* (2013.01)

(58) Field of Classification Search
CPC .................................. H04L 67/54; G01S 19/13
See application file for complete search history.

(56) References Cited

U.S. PATENT DOCUMENTS

| | | |
|---|---|---|
| 10,309,787 B2 | 6/2019 | Strauf et al. |
| 2012/0136570 A1 | 5/2012 | Yamashita et al. |
| 2013/0304363 A1 | 11/2013 | Dai et al. |
| 2015/0134233 A1 | 5/2015 | Wolf |
| 2015/0285656 A1 | 10/2015 | Verheyen et al. |
| 2016/0066155 A1 | 3/2016 | Fan et al. |
| 2016/0327404 A1 | 11/2016 | Israelsson et al. |
| 2017/0061787 A1 | 3/2017 | Lorkowski et al. |
| 2017/0074670 A1 | 3/2017 | Tashiro et al. |
| 2017/0364090 A1* | 12/2017 | Grufman ............. G05D 1/0274 |

FOREIGN PATENT DOCUMENTS

JP 2005267472 A 9/2005

* cited by examiner

*Primary Examiner* — Hongmin Fan
(74) *Attorney, Agent, or Firm* — Fenwick & West LLP (57) ABSTRACT

A first set of traces is received by a device, each trace including a set of location data. Each set of location data includes an origin point, a plurality of intermediate points, and a destination point in an ordered sequence. A bounding box surrounding a trace of the first set of traces is drawn, the bounding box corresponding to endpoints of the trace. A function determines a threshold and classifies a trace as stationary or non-stationary. A trace is classified as stationary or non-stationary by comparing a ratio represented by the trace length divided by the bounding box diagonal length to the determined threshold. In response to classifying the trace as stationary, the trace is labeled as stationary. In response to classifying the trace as non-stationary, extremities are extracted from the trace for re-classifying.

19 Claims, 8 Drawing Sheets

STATIONARY CLASSIFIER FOR GEOGRAPHIC ROUTE TRACE DATA

CROSS-REFERENCE TO RELATED APPLICATIONS

This application is a continuation of application Ser. No. 16/010,238, filed Jun. 15, 2018, the entire contents of which is hereby incorporated by reference for all purposes as if fully set forth herein.

TECHNICAL FIELD

The present disclosure generally relates to improved methods, computer software and/or computer hardware in the field of digital mapping, and more specifically relates to improved computer-implemented methods for classifying location data that is received from computing devices such as personal mobile computing devices and/or onboard computing devices.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Digitally stored electronic maps are used to provide directions to users of mobile devices, for example, using any of a wide array of standalone map or direction application programs or apps. Today's electronic maps correctly determine where a mobile device is within a few feet or meters, and show where the user of that mobile device is on the electronic map in real time. Electronic maps also typically include other functionality, such as providing turn-by-turn directions to nearly any location. Additional elements such as traffic or wrecks may also be shown.

Electronic maps also appear in other applications aside from standalone mapping applications. For example, ride sharing applications, taxi applications, video games, and other applications may use digital maps. These or other applications can obtain electronic maps by calling a map server computer through an Application Programming Interface (API). Thus, a single electronic map provider that owns or operates the server computer may supply the electronic maps for many different applications.

When a mobile device is using an electronic map, the location of the mobile device can be determined using WiFi or the Global Positioning System (GPS), which reports a device location using latitude and longitude, and optionally height and time as well. This location data, as well as other data, may be collected by the electronic map provider and may be termed "telemetry" data for the mobile device. Other information, such as speed, direction of movement, acceleration, and deceleration may be calculated using the GPS data. This information, along with the location data, is very useful in providing traffic and route information, among other services.

A trace includes an ordered sequence of points, each point associated with a location and one or more adjacent points in the trace, and other suitable telemetry data. Conventional methods classify traces as stationary or non-stationary solely based on trace length. However, in some cases, a trace is too long compared to a realistic path it should have taken, so it is difficult to accurately classify such traces. Thus, improved methods for classifying traces are considered desirable.

SUMMARY

The method of the present disclosure is an improvement in the technical field of data processing, and more specifically, classifying activities of mobile computing devices based upon data representing movement of the devices. A trace includes an ordered sequence of points, each point associated with a location and one or more adjacent points in the trace, and other suitable telemetry data. Conventional methods classify a trace as stationary or non-stationary solely based on trace length. However, in some cases, a trace is too long compared to a realistic path it should have taken, so it is difficult to accurately classify such traces.

The method of the present disclosure, in contrast, classifies a trace by comparing the length of the trace and the length of a bounding box surrounding the trace. A threshold for prediction is determined by providing the bounding box diagonal length as an input to a custom sigmoid function. The sigmoid function is non-linear and allows for a greater threshold for traces with large bounding boxes since there are multiple valid longest trace paths within the bounding box. The threshold is lower in smaller bounding boxes since the trace path does not have as much liberty. The ratio represented by the trace length divided by the bounding box diagonal length is compared to the determined threshold, and a stationary classifier classifies the trace as stationary or non-stationary based on the comparison. A trace is predicted as stationary if it is too long compared to a realistic path is should have taken. In some embodiments, the trace length is compared to the determined threshold.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Computer-implemented techniques are provided for classifying location data in digitally stored electronic maps. In some embodiments, location data is telemetry data storing information about the location and movement of a user, user device, or other suitable device or object. For example, telemetry data can represent the physical movement of a device from a first location to a second location. Telemetry data can be obtained or received as digital data from suitable computing devices, such as mobile devices and onboard computing devices, and may comprise a series of data tuples, for example representing location information or metadata, which the computing devices transmit periodically over time.

As used herein, telemetry data representing a trip of a device from an origin location to a destination location is termed a "trace." A trace may include an ordered sequence of points, each point associated with a location and one or more adjacent points in the trace, and other suitable telemetry data. For example, a user's trip from home to work can be represented in telemetry data by a single trace. In this example, the first point of the associated trace is associated with the location of the user's home and the last point of the trace associated with the user's work. The path taken from the user's home to the user's work can be represented in a series of intermediate points between the first and last points of the trace and one or more links between adjacent points of the trace. As each trace represents a single trip, many traces for a single device may be collected in a single day and many more over a longer period. For example, over a period of a month, twenty traces may be collected for a user's trips from home to work.

Traces may be classified as stationary or non-stationary. For example, a trace in which user is eating at a restaurant or shopping at a store is a stationary trace, whereas a trace in which a user is commuting to work is a non-stationary trace. Conventional methods classify a trace as stationary or non-stationary solely based on trace length. However, in some cases, a trace is too long compared to a realistic path it should have taken, so it is difficult to accurately classify such traces. According to the method of the present disclosure, a first set of traces is received by a device, each trace including a set of location data. Each set of location data includes an origin point, a plurality of intermediate points, and a destination point in an ordered sequence. A bounding box surrounding a trace of the first set of traces is drawn, the bounding box corresponding to endpoints of the trace. A function determines a threshold and classifies a trace as stationary or non-stationary. A trace is classified as stationary or non-stationary by comparing bounding box diagonal length to the determined threshold. In some embodiments, the bounding box diagonal length is not compared directly to the determined threshold. For example, one or more factors each with a weight may be applied to the function before comparison, thereby impacting the determined threshold. Another function may also be applied to the function before comparison. In response to classifying the trace as stationary, the trace is labeled as stationary. In response to classifying the trace as non-stationary, extremities are extracted from the trace for re-classifying. In some embodiments, a trace is classified as stationary or non-stationary by comparing the trace length to the determined threshold.

Figure 1:
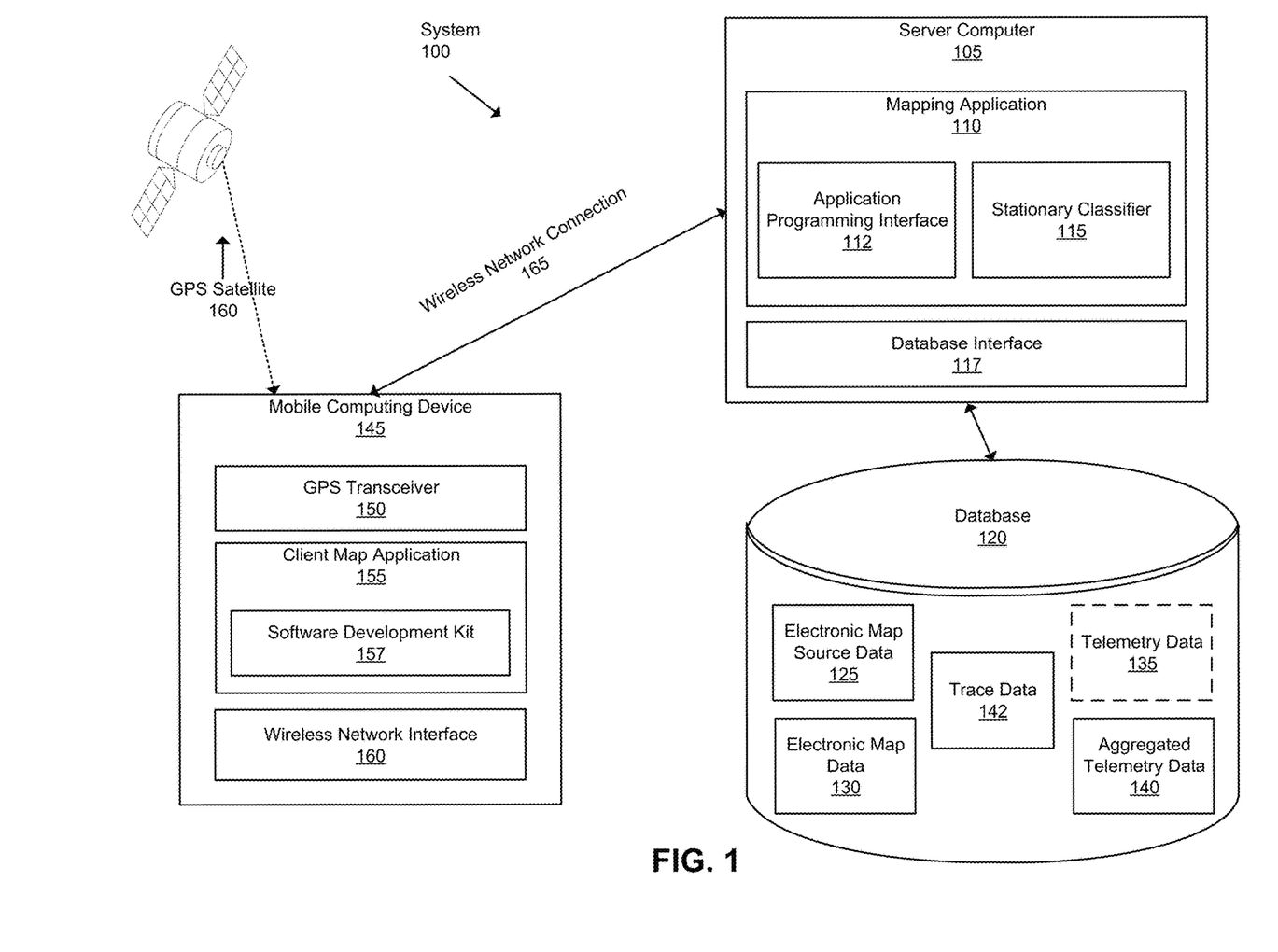
FIG. 1 illustrates an example computer system in which the techniques described may be practiced, in accordance with an embodiment.

FIG. 1 illustrates an example computer system in which the techniques described may be practiced, in accordance with an embodiment.

In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates a mobile computing device 145 that is coupled via a wireless network connection 165 to a server computer 105, which is coupled to a database 120. A GPS satellite 160 is coupled via a wireless connection to the mobile computing device 145. The server computer 105 comprises a mapping application 110, an application programming interface (API) 112, activity detection instructions 115, and a database interface 117. The database 120 comprises electronic map source data 125, electronic map data 130, telemetry data 135, aggregated telemetry data 140, and trace data 142. The mobile computing device 145 comprises a GPS transceiver 150, client map application 155, software development kit (SDK) 157 and wireless network interface 160.

Server computer 105 may be any computing device, including but not limited to: servers, racks, work stations, personal computers, general purpose computers, laptops, Internet appliances, wireless devices, wired devices, multi-processor systems, mini-computers, and the like. Although FIG. 1 shows a single element, the server computer 105 broadly represents one or multiple server computers, such as a server cluster, and the server computer may be located in one or more physical locations. Server computer 105 also may represent one or more virtual computing instances that execute using one or more computers in a datacenter such as a virtual server farm.

Server computer 105 is communicatively connected to database 120 and mobile computing device 145 through any kind of computer network using any combination of wired and wireless communication, including, but not limited to: a Local Area Network (LAN), a Wide Area Network (WAN), one or more internetworks such as the public Internet, or a company network. Server computer 105 may host or execute mapping application 110, and may include other applications, software, and other executable instructions, such as database interface 117, to facilitate various aspects of embodiments described herein.

In one embodiment, database interface 117 is a programmatic interface such as JDBC or ODBC for communicating with database 120. Database interface 117 may communicate with any number of databases and any type of database, in any format. Database interface 117 may be a piece of custom software created by an entity associated with mapping application 110, or may be created by a third party entity in part or in whole.

In one embodiment, database 120 is a data storage subsystem consisting of programs and data that is stored on any suitable storage device such as one or more hard disk drives, memories, or any other electronic digital data recording device configured to store data. Although database 120 is depicted as a single device in FIG. 1, database 120 may span multiple devices located in one or more physical locations. For example, database 120 may include one or nodes located at one or more data warehouses. Additionally, in one embodiment, database 120 may be located on the same device or devices as server computer 105. Alternatively, database 120 may be located on a separate device or devices from server computer 105.

Database 120 may be in any format, such as a relational database, a noSQL database, or any other format. Database 120 is communicatively connected with server computer 105 through any kind of computer network using any combination of wired and wireless communication of the type previously described. Optionally, database 120 may be communicatively connected with other components, either directly or indirectly, such as one or more third party data suppliers. Generally, database 120 stores data related to electronic maps including, but not limited to: electronic map source data 125, electronic map data 130, telemetry data 135, and aggregated telemetry data 140. These datasets may be stored as columnar data in a relational database or as flat files.

In one embodiment, electronic map source data 125 is raw digital map data that is obtained, downloaded or received from a variety of sources. The raw digital map data may include satellite images, digital street data, building or place data or terrain data. Example sources include National Aeronautics and Space Administration (NASA), United States Geological Survey (USGS), and DigitalGlobe. Electronic map source data 125 may be updated at any suitable interval, and may be stored for any amount of time. Once obtained or received, electronic map source data 125 is used to generate electronic map data 130.

In one embodiment, electronic map data 130 is digital map data that is provided, either directly or indirectly, to client map applications, such as client map application 155, using an API. Electronic map data 130 is based on electronic map source data 125. Specifically, electronic map source data 125 is processed and organized as a plurality of vector tiles which may be subject to style data to impose different display styles. Electronic map data 130 may be updated at any suitable interval, and may include additional information beyond that derived from electronic map source data 125. For example, using aggregated telemetry data 140, discussed below, various additional information may be stored in the vector tiles, such as traffic patterns, turn restrictions, detours, common or popular routes, speed limits, new streets, and any other information related to electronic maps or the use of electronic maps.

In one embodiment, telemetry data 135 is digital data that is obtained or received from mobile computing devices via function calls that are included in a Software Development Kit (SDK) that application developers use to integrate and include electronic maps in applications. As indicated by the dotted lines, telemetry data 135 may be transiently stored, and is processed as discussed below before storage as aggregated telemetry data 140.

The telemetry data may include mobile device location information based on GPS signals. For example, telemetry data 135 may comprise one or more digitally stored events, in which each event comprises a plurality of event attribute values. Telemetry events may include: session start, map load, map pan, map zoom, map tilt or rotate, location report, speed and heading report, or a visit event including dwell time plus location. Telemetry event attributes may include latitude-longitude values for the then-current position of the mobile device, a session identifier, instance identifier, application identifier, device data, connectivity data, view data, and timestamp.

In one embodiment, aggregated telemetry data 140 is telemetry data 135 that has been processed using anonymization, chunking, filtering, or a combination thereof. Anonymization may include removing any data that identifies a specific mobile device or person. Chunking may include segmenting a continuous set of related telemetry data into different segments or chunks representing portions of travel along a route. For example, telemetry data may be collected during a drive from John's house to John's office. Chunking may break that continuous set of telemetry data into multiple chunks so that, rather than consisting of one continuous trace, John's trip may be from John's house to point A, a separate trip from point A to point B, and another separate trip from point B to John's office. Chunking may also remove or obscure start points, end points, or otherwise break telemetry data into any size. Filtering may remove inconsistent or irregular data, delete traces or trips that lack sufficient data points, or exclude any type or portion of data for any reason. Once processed, aggregated telemetry data 140 is stored in association with one or more tiles related to electronic map data 130. Aggregated telemetry data 140 may be stored for any amount of time, such as a day, a week, or more. Aggregated telemetry data 140 may be further processed or used by various applications or functions as needed.

In one embodiment, mobile computing device 145 is any mobile computing device, such as a laptop computer, handheld computer, wearable computer, cellular or mobile phone, portable digital assistant (PDAs), or tablet computer. Although a single mobile computing device is depicted in FIG. 1, any number of mobile computing devices may be present. Each mobile computing device 145 is communicatively connected to server computer 105 through wireless network connection 165 which comprises any combination of a LAN, a WAN, one or more internetworks such as the public Internet, a cellular network, or a company network.

Mobile computing device 145 is communicatively coupled to GPS satellite 160 using GPS transceiver 150. GPS transceiver 150 is a transceiver used by mobile computing device 145 to receive signals from GPS satellite 160, which broadly represents three or more satellites from which the mobile computing device may receive signals for resolution into a latitude-longitude position via triangulation calculations.

Mobile computing device 145 also includes wireless network interface 160 which is used by the mobile computing device to communicate wirelessly with other devices. In particular, wireless network interface 160 is used to establish wireless network connection 165 to server computer 105. Wireless network interface 160 may use WiFi, WiMAX, Bluetooth, ZigBee, cellular standards, or others.

Mobile computing device 145 also includes other hardware elements, such as one or more input devices, memory, processors, and the like, which are not depicted in FIG. 1. Mobile computing device 145 also includes applications, software, and other executable instructions to facilitate various aspects of embodiments described herein. These applications, software, and other executable instructions may be installed by a user, owner, manufacturer, or other entity related to mobile computing device. In one embodiment, mobile computing device 145 includes client map application 155 which is software that displays, uses, supports, or otherwise provides electronic mapping functionality as part of the application or software. Client map application 155 may be any type of application, such as a taxi service, a video game, a chat client, a food delivery application, etc. In an embodiment, client map application 155 obtains electronic mapping functions through SDK 157, which may implement functional calls, callbacks, methods or other programmatic means for contacting the server computer to obtain digital map tiles, layer data, or other data that can form the basis of visually rendering a map as part of the application. In general, SDK 157 is a software development kit that allows developers to implement electronic mapping without having to design all of the components from scratch. For example, SDK 157 may be downloaded from the Internet by developers, and subsequently incorporated into an application which is later used by individual users.

In server computer 105, the mapping application 110 provides the API 112 that may be accessed, for example, by client map application 155 using SDK 157 to provide electronic mapping to client map application 155. Specifically, mapping application 110 comprises program instructions that are programmed or configured to perform a variety of backend functions needed for electronic mapping including, but not limited to: sending electronic map data to mobile computing devices, receiving telemetry data 135 from mobile computing devices, receiving trace data 142 from mobile computing devices, processing telemetry data to generate aggregated telemetry data 140, receiving electronic map source data 125 from data providers, processing electronic map source data 125 to generate electronic map data 130, and any other aspects of embodiments described herein. Mapping application 110 includes activity detection instructions 115 which are programmed or configured to determine the activity or travel mode of the mobile computing device 145 based on trace data 142 received from the mobile computing device 145. In some embodiments, the mapping application 110 includes a stationary classifier 115 to perform a binary classification of the trace data 142. The stationary classifier 115 is a function that classifies the trace data 142 as stationary or non-stationary. In some embodiments, the stationary classifier 115 is a trained machine learning (ML) model. The stationary classifier 115 and its operation are described below with reference to FIGS. 3-5 in detail.

According to one embodiment, the techniques described herein are implemented by one or more special-purpose computing devices. For example, the server computer 105 and mobile computing device 145 may be computer devices configured as special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 2A:
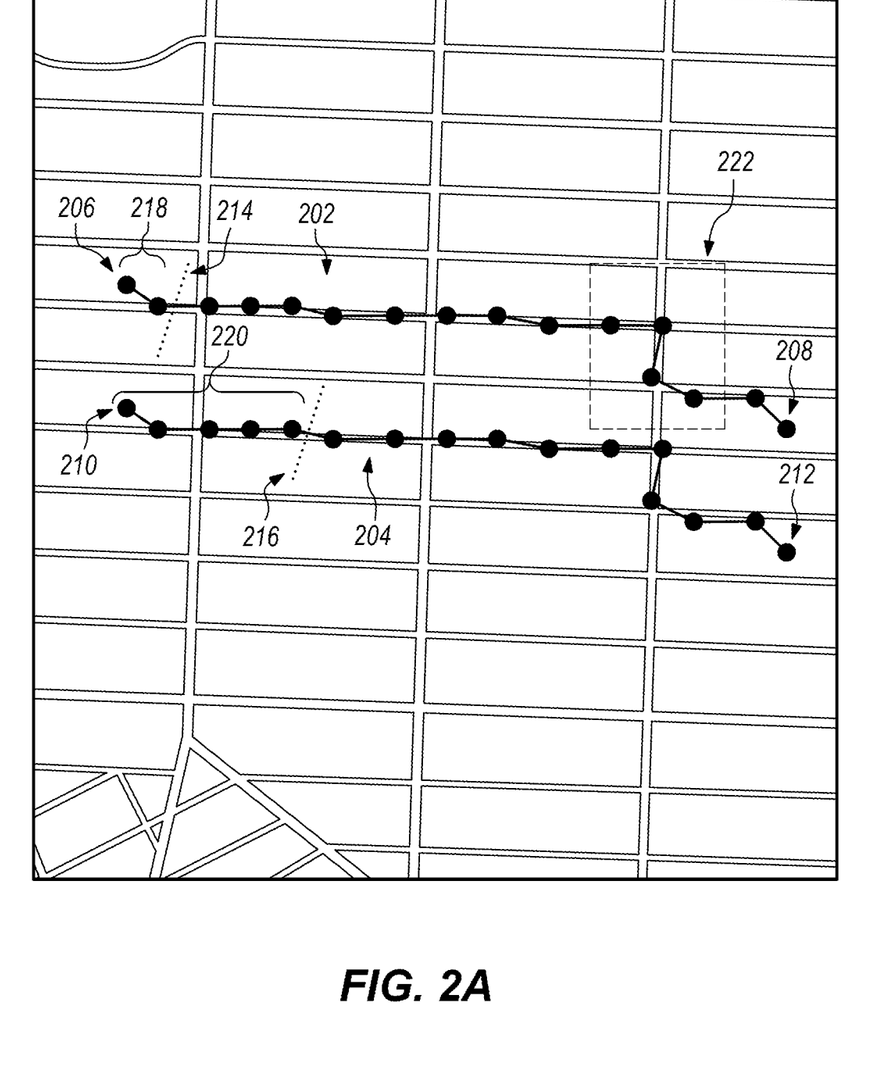
FIG. 2A illustrates example location trace data, in accordance with an embodiment.
Figure 2B:
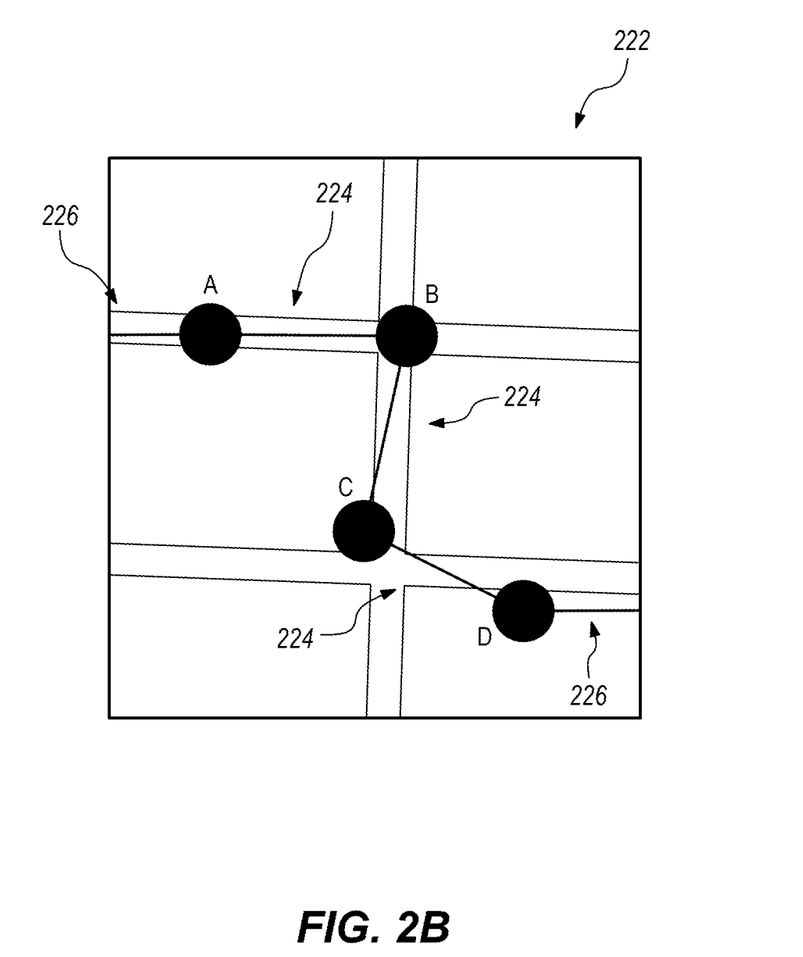
FIG. 2B illustrates example anonymized location trace data, in accordance with an embodiment.

FIG. 2A and FIG. 2B illustrate an example of data anonymization, in accordance with an embodiment.

In the embodiment of FIG. 2A, a first trace 202 and a second trace 204 are shown on a digital map. FIG. 2A shows hypothetical data and maps and is provided merely to illustrate one clear example; other embodiments may use other forms of data or maps to perform equivalent functions in relation to different data.

The first trace 202 and second trace 204 may each comprise telemetry data representing the movement patterns of a device for a trip. The device associated with the first trace 202 and the device associated with the second trace 204 may be two different devices or a single device on two separate occasions. For example, the first trace 202 may comprise trace data collected from a first client device belonging to a first user and the second trace 204 may comprise trace data collected from a second client device of a second user. Alternatively, the first trace 202 may comprise trace data collected from the first client device on a first day and the second trace 202 may comprise trace data collected from the first client device on a second day.

In the embodiment of FIG. 2A, each of the first trace 202 and the second trace 204 is comprised of a plurality of points of telemetry data and connections between the points of telemetry data. The first trace 202 comprises a first origin point 206 and a first destination point 208 connected by a plurality of intermediate points. The first origin point 206 and the first destination point 208 represent the starting and ending locations, respectively, for a trip associated with the trace. As described above, each trip may represent the motion and/or location of a client device over a period of time. For example, when a user carrying a client device travels from home to work, the first origin point 206 can be situated approximately at the user's home. Similarly, the second trace 204 comprises a second origin point 210, a second destination point 212, and multiple intermediate points.

As described above, trace data can be used to determine personal information about the associated user, for example the locations of the user's home, workplace, and other significant locations visited by the user. Further, a user's patterns of movements could also potentially be determined from a plurality of traces, for example by associating traces associated with the same client device, or associating traces sharing the same origin or destination point. For example, the client device associated with the first trace 202 could be associated with a user living at the address associated with the first origin point 206 based at least in part on the first trace 202. Therefore, in some embodiments, certain sections of received traces may be removed to obfuscate the original origin 206 and destination 208 points of a trace or other relevant sections of the trace. For example, in FIG. 2A, a first cutoff 214 is indicated for the first trace 202. The first cutoff 214 divides the first origin section 218 containing the first origin point 206 from the remainder of the trace 202. That is, the first origin cutoff 214 divides the points of telemetry data associated with the first trace 202 into two sections, the first origin section 218 and a section comprising the remaining points associated with the trace. In the embodiment of FIG. 2A, the first origin section 218 includes multiple points (including the first origin point 206) and connections between points. In some implementations, the section containing the origin point 206 (in this case the first origin section 218) is discarded, thereby obscuring the original origin point of the trace. In this way, it can be more difficult to determine personal user information such as a user's home using trace data including the first trace 206 or the second trace 204. This process can be repeated to generate a first destination cutoff, then determine and discard a destination section including the first destination point 208 to obscure the original destination of the first trace 202.

Similarly, origin and destination of the second trace 204 can be similarly obscured. In the embodiment of FIG. 2A, the second trace 204 includes a second origin cutoff 216 separating a second origin section 220 from the rest of the second trace 204. To obscure the origin of the second trace 204, the second origin section, including the second origin point 210 and a set of intermediate points, can be removed. As with the first trace 202, the destination of the second trace 204 can also be obscured.

In some embodiments, sections are measured based on the number of points associated with the section. Each section can be considered to have a "size," which may be indicative of distance traveled in the section, elapsed time associated with points in the section, number of points in the section, or another appropriate measurement. For example, a section can be measured by how much time passed between the first and last points of the section or by the travel distance along the trace between the first and last points in the section.

As shown in FIG. 2A, the removed sections (for example the first and second origin sections 218 and 220) may have varying sizes. That is, in an embodiment, the first origin section 218 consisting of two points is removed from the first trace 202 and the second origin section 220 consisting of (for example) five points is removed from the second trace 204. In some embodiments, the size of an origin or destination section may be determined randomly via a randomization process, which may use a random or pseudo-random calculation or algorithm for selection. "Random," "randomly sized" and "randomization", as used herein, refer broadly to truly random or pseudo-random techniques. The randomization process may rely on a range of values that may be set based on the overall size of the trace. For example, the randomization process may randomly calculate or choose a number of points between 3 and 20, a distance between 150 and 1,000 feet, or an elapsed time between 30 and 300 seconds to generate origin and destination sections. In some implementations, a minimum size of an origin or destination section can be set to ensure that the generated section sufficiently obscures the origin or destination of the trace. In some embodiments, randomization ranges are based on the size of the trace, for example, increasing for larger traces and decreasing for smaller traces. For example, the size of a randomization range or section can scale based on a percentage of the overall/current size of the trace.

In some implementations, a randomly-sized section is removed from the beginning of each trace. Additionally or alternatively, a randomly-sized section is also removed from the ending of each trace. In this way, the origin and destination for each trace can be effectively obscured. In some implementations, anonymization ends after the generation of the obscured trace. However, in other embodiments the obscured trace can be further anonymized, as personal information about a user can potentially still be determined from an obscured trace, such as the general location of the user's home, general movement patterns of the user, or other personal information about the user.

Therefore, after the origin and destination of a trace has been obscured, for example by determining and discarding origin and destination sections for the trace, an obscured trace can be divided to form one or more subtraces for storage and retrieval by the server computer 105. As described above, a subtrace is an independent subsection of a trace, for example the trace 202. An example subtrace 222 is shown in FIG. 2A. The subtrace 222 is a section of the trace 202 including one or more points associated with the trace 202. In the embodiment of FIG. 2A, the origin and destination sections of the trace 202 have been removed to obscure the trace 202, and the remaining intermediate points of the trace 202 can be divided into a set of subtraces, including the subtrace 222. In some implementations, subtraces are stored independently of the associated trace and other subtraces generated from the same trace, allowing trace data (in the form of subtraces) to be stored and analyzed by the server computer 105 without compromising user privacy or personal information. In some implementations, the origin and destination of each subtrace is obscured using similar methods as described above.

A trace can be divided into subtraces randomly, semi-randomly, or based on any suitable criteria or combination of criteria, for example, based on measurements of distance, time, or number of points. For example, a trace may be divided into subsets that represent no more than five minutes or five miles of travel. In some embodiments, divisions between subtraces are determined at least in part based on features of interest. For example, a trace may be divided into subtraces such that each subtrace includes at least one feature of interest.

As used herein, a "feature of interest" can be any action or maneuver recorded by a series of points of telemetry data, which can provide useful information to the mapping application 110. Features of interest include turning, speeding up, slowing down, stopping, starting, changing lanes, and so on. In some implementations, features of interest are used by the mapping application 110 to increase the quality of the digital maps provided to the client devices 145, for example by improving turn by turn instructions. For example, in FIG. 2B, points A-C of the subtrace 222 are indicative of a right turn feature of interest. This information can be useful in determining that right turns are allowed at that intersection, how fast users typically travel when making the turn, how often turns are made at the intersection, and so on.

FIG. 2B illustrates an example subtrace 222. For clarity, the example subtrace 222 includes four points, denoted herein as points A, B, C, and D. In other embodiments, subtraces may include any suitable number of points or amount of telemetry data. For example, each subtrace can include between 50 and 300 points. The subtrace 222 also includes several connectors linking the points of the subtrace 222 with other points of the trace 202, which will be referred to herein as "intra-connectors" 224 and "inter-connectors" 226. Intra-connectors 224 represent links between points within the subtrace 222. For example, an intra-connector 224 connects point A to point B, another intra-connector 224 connects point B to point C, and a third intra-connector 224 connects point C to point D. In contrast, inter-connectors 226 connect points within the subtrace 222 to points outside the subtrace 222 (for example, points in other subtraces generated from the trace 202). For example, points A and D each have inter-connectors connecting them to points outside the subtrace 222.

Intra-connectors 224 and inter-connectors 226 between two points indicate at least that the two points are both members of the same trace and each of the two points either immediately precedes or follows the other. For example, the intra-connector 224 between points A and B indicates both that the points A and B are members of the same first trace 202 and that point B immediately follows or precedes point A. Analysis of time stamps associated with points A and B may further indicate that point B immediately follows point A and that points A and B are connected.

After the remaining intermediate points of the trace 202 are divided into a plurality of subtraces, including the subtrace 222, connections linking different subtraces together can be removed. For example, the inter-connectors 226 may be removed to disassociate the subtrace 222 with other subtraces generated from the same trace 202. Once the links between the subtrace 222 and neighboring subtraces are removed, the subtrace 222 provides no indication of which point precedes point A and which point follows point D. That is, each subtrace, including the subtrace 222, is independent of other subtraces generated from trace 202 and does not contain any information linking the subtrace 222 with any other subtraces based on the trace 202. Therefore, multiple subtraces cannot be grouped together to recreate the original trace 202. Further, because the subtrace 222 contains information on only a small subsection of a trip (which may be interchangeable with many other trips following a similar route along that subsection) the information contained in the subtrace 222 is difficult to trace to the client device 145 and associated user that provided the original trace 202.

In some embodiments, individual subtraces are further anonymized by removing randomized sections of the subtrace. For example, a random-sized origin section that includes point A may be removed from the beginning of subtrace 222 and a random-sized destination section that includes point D may be removed from the end of subtrace 222. The size of the removed sections may be randomly or semi-randomly selected, predetermined, or selected based on any suitable criteria and may vary between subtraces. The generated subtraces can then be stored as anonymized trace data 142 in the database 120.

In some implementations, the server computer 105 or another system used for creating or updating digital maps may access only subtraces and may not access non anonymized trace data as provided by client devices 145 when creating or updating digital maps. That is, that server computer 105 may only access subtraces or similarly anonymized data for small portions of traces that do not include origin, destination, connections to other subtraces, or certain device data. In this way, the data used in developing digital maps is not traceable to individual users, according to some embodiments.

Figure 3A:
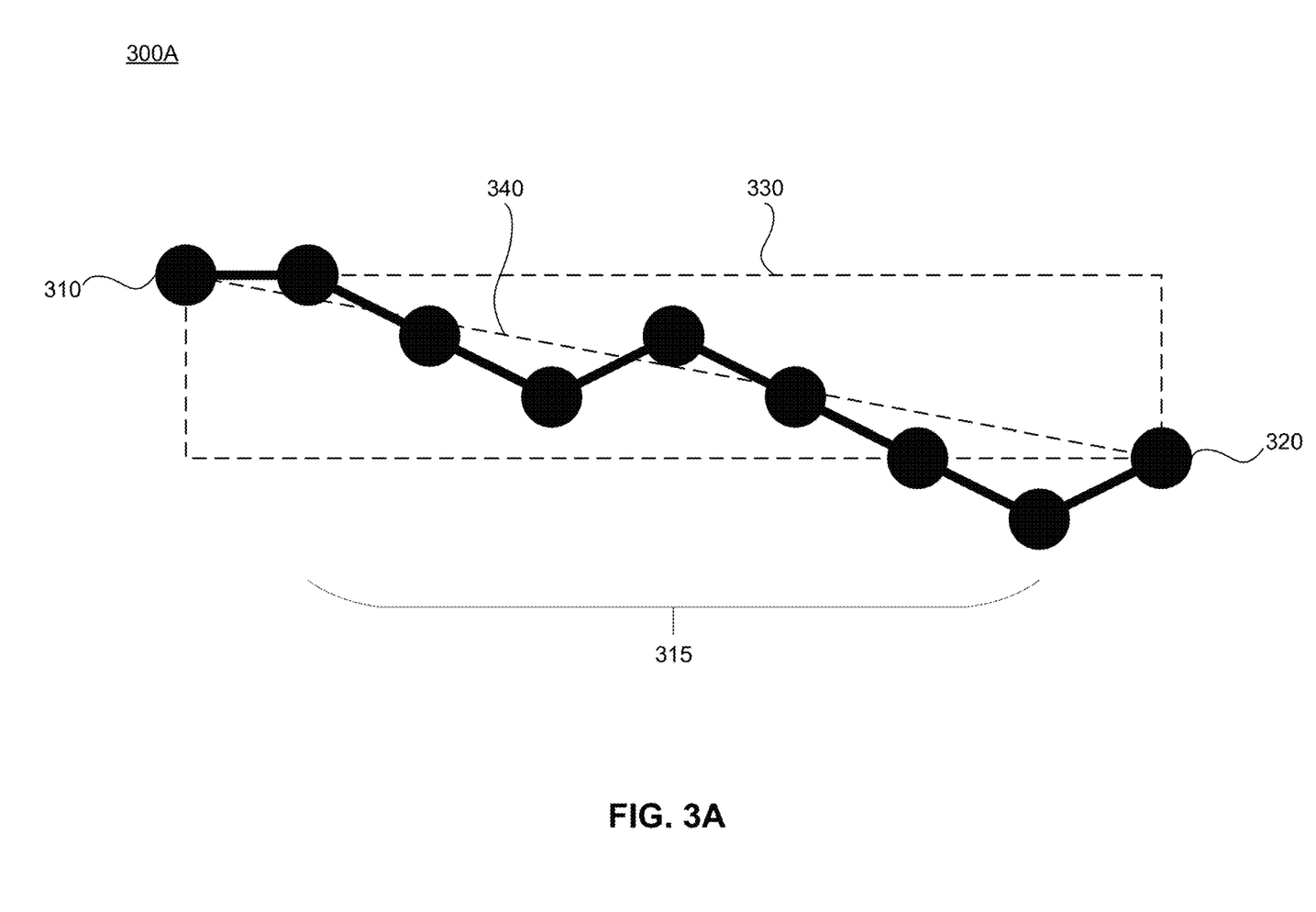
FIG. 3A illustrates a non-stationary trace, in accordance with an embodiment.
Figure 3B:
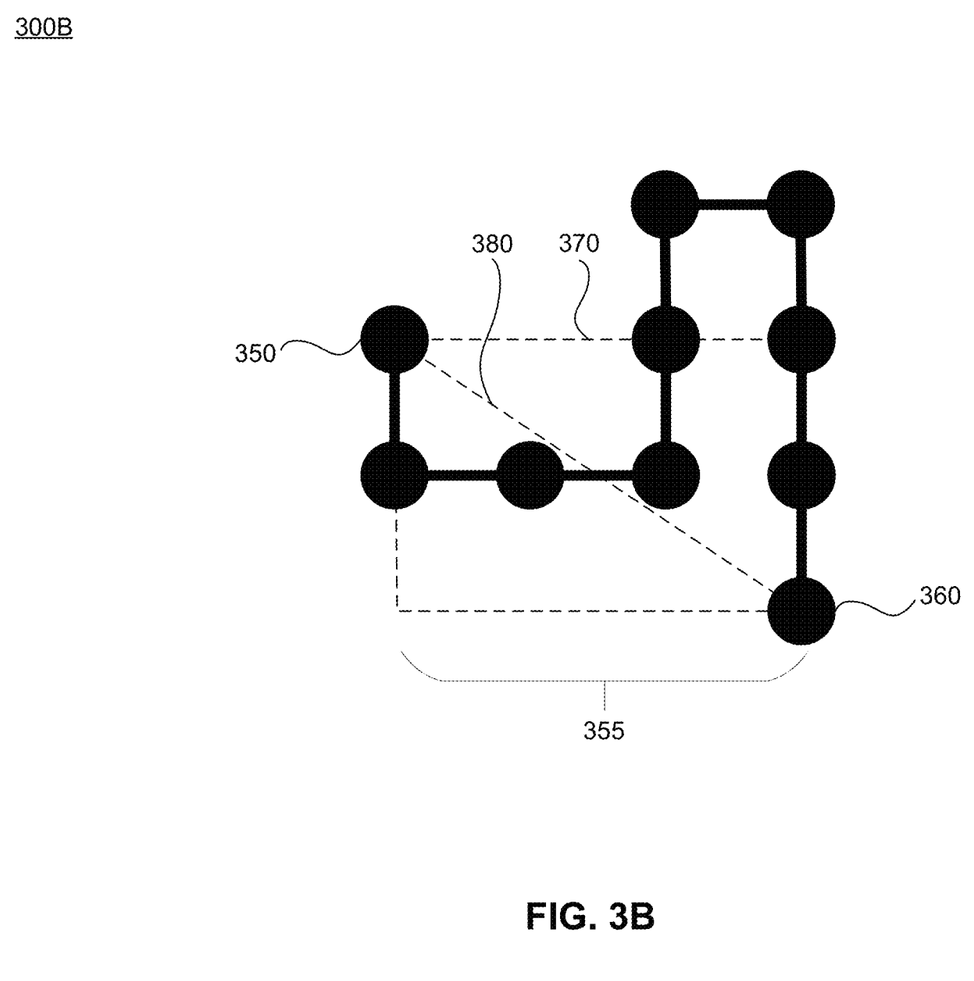
FIG. 3B illustrates a stationary trace, in accordance with an embodiment.

FIG. 3A and FIG. 3B illustrate non-stationary and stationary traces, respectively, in accordance with an embodiment. FIG. 3A and FIG. 3B show hypothetical data and are provided merely to illustrate clear examples; other embodiments may use other forms of data to perform equivalent functions in relation to different data.

In the embodiment of FIG. 3A, a non-stationary trace 300A is shown. The non-stationary trace 300A may be shown on a digital map (not shown in FIG. 3A). The non-stationary trace 300A may include telemetry data representing the movement patterns of a device for a trip. The non-stationary trace 300A includes telemetry data including an origin point 310 and a destination point 320 connected by a plurality of intermediate points 315. The origin point 310 and the destination point 320 represent a starting location and an ending location, respectively, for a trip associated with the non-stationary trace 300A. A trip represents the motion and/or location of a client device over a period of time.

The stationary classifier 115 receives a first set of traces by a device, each trace including a set of location data, each set of location data comprising an origin point, a plurality of intermediate points, and a destination point in an ordered sequence. In some embodiments, the first set of traces are anonymized, as described above with reference to FIG. 2A and FIG. 2B. The non-stationary trace 300A may be a part of the first set of traces. The stationary classifier 115 draws a bounding box 330 surrounding the non-stationary trace 300A, the bounding box 330 corresponding to endpoints of the non-stationary trace 300A. Trace length is the sum of the links between the adjacent points of the trace. A bounding box better captures the displacement of a trace than trace length. For example, the bounding box 330 captures the displacement of the non-stationary trace 300A. The endpoints may include the origin point 310 and the destination point 320. In some embodiments, the stationary classifier 115 draws a boundary box 330 between any two of the origin point 310, the plurality of intermediate points 315, and the destination point 320. The stationary classifier 115 determines the diagonal length 340 of bounding box 330. The diagonal length 340 of the non-stationary trace 300A is provided as an input to a custom sigmoid function to determine a threshold for prediction. The ratio represented by the trace length divided by the bounding box diagonal length is compared to a determined threshold. For example, the ratio is greater than or equal to the threshold, so the stationary classifier 115 accordingly classifies the non-stationary trace 300A as non-stationary. The stationary classifier 115 classifies each trace of the first set of traces. In some embodiments, the bounding box diagonal length is not compared directly to the determined threshold. For example, one or more factors each with a weight may be applied to the function before comparison, thereby impacting the determined threshold. The one or more factors may include geolocation factors (e.g., urban vs. rural, country, traffic patterns, types of paths/roadways) and temporal factors (e.g., time of day). Another function may also be applied to the function before comparison. An embodiment of the function is described below with reference to FIG. 4 in detail.

In some embodiments, the stationary classifier 115 is a machine learning (ML) model that receives a second set of traces by a device known to represent stationary traces and is trained using the second set of traces. The stationary classifier 115 classifies a trace as stationary or non-stationary. The stationary classifier 115 may determine the trained weight for each of the plurality of factors. The plurality of factors includes, among other factors, the bounding box diagonal length. In some embodiments, the plurality of factors further includes geolocation factors. For example, the stationary classifier 115 may classify a trace in an urban environment differently than the same trace in a rural environment. The stationary classifier 115 may retrieve geolocation information from the database 120 to determine the geolocation factors and the trained weights.

In the embodiment of FIG. 3B, a stationary trace 300B is shown. Similar to the non-stationary trace 300A, the stationary trace 300B also includes telemetry data including an origin point 350 and a destination point 360 connected by a plurality of intermediate points 355. The points of the stationary trace 300B are in closer proximity to each other than the points of the first trace 300A. Consequently, the diagonal length 380 of bounding box 370 of the stationary trace 300B is less than the diagonal length 340 of bounding box 330 of the non-stationary trace 300A. The length of the stationary trace 300B is too long compared to the diagonal length 380, so the stationary classifier 115, for example, classifies the stationary trace 300B as stationary. That is, the ratio represented by the trace length divided by the bounding box diagonal length 380 is less than the threshold, so the stationary classifier 115 accordingly classifies the stationary trace 300B as stationary.

Figure 4:
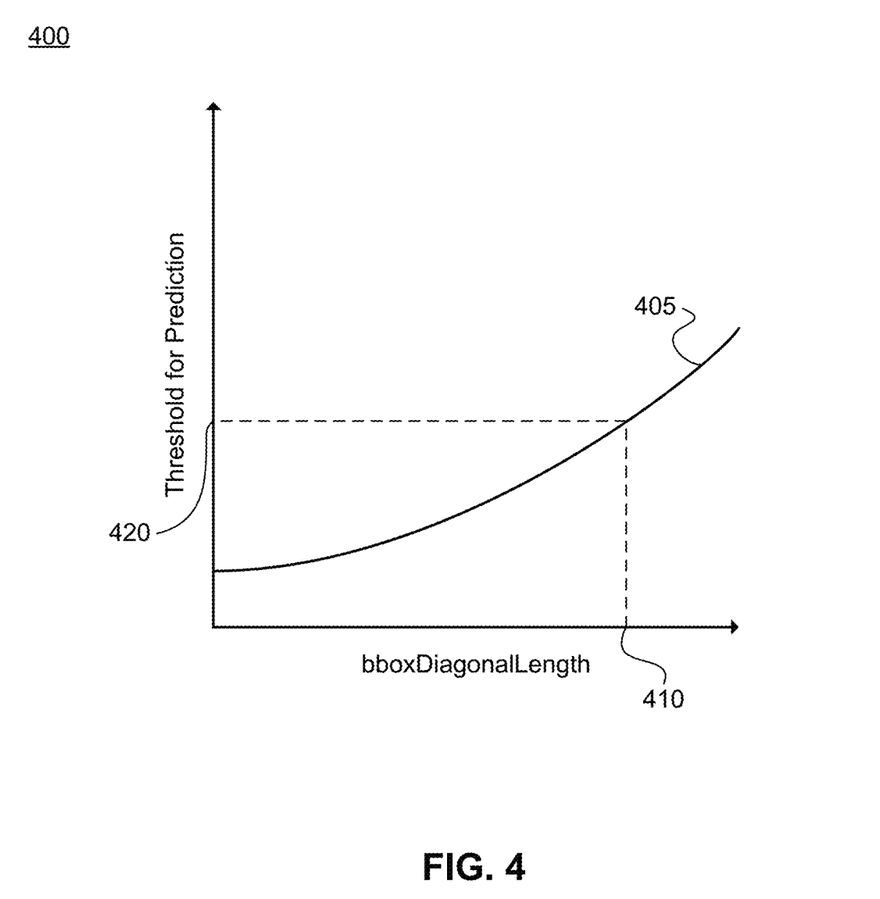
FIG. 4 illustrates a graph of a custom sigmoid function, in accordance with an embodiment.

FIG. 4 illustrates a graph 400 of a custom sigmoid function 405, in accordance with an embodiment. The custom sigmoid function 405 outputs a threshold for prediction to use for determining whether a trace is stationary or non-stationary. The graph 400 includes "bboxDiagonalLength," or bounding box diagonal length, as the horizontal x-axis and threshold for prediction as the vertical y-axis. bboxDiagonalLength and threshold for prediction may be measured in a desired unit of length. In the embodiment of FIG. 4, the threshold is determined using custom sigmoid function 405, y=2+1.7/(0.5+Math.exp(5.5−(20*bboxDiagonalLength))). More generally, in some embodiments, the threshold is a function of bounding box diagonal length.

The stationary classifier 115 determines the diagonal length of a bounding box of a trace, and the bounding box diagonal length is provided as an input 410 to the custom sigmoid function 405. The threshold 420 is the point at which input 410 intersects the custom sigmoid function 405. The stationary classifier 115 classifies the trace as stationary or non-stationary by comparing the ratio represented by the trace length divided by the bounding box diagonal length to the threshold 420. In some embodiments, the bounding box diagonal length is not compared directly to the determined threshold. For example, one or more factors each with a weight may be applied to the custom sigmoid function 405 before comparison, thereby impacting the threshold 420. Another function may also be applied to the custom sigmoid function 405 before comparison. The stationary classifier 115 classifies the trace as stationary if the ratio is less than the threshold 420. The stationary classifier 115 classifies the trace as non-stationary if the ratio is greater than or equal to the threshold 420. In some embodiments, the stationary classifier 115 classifies the trace as stationary or non-stationary by comparing the trace length to the threshold 420.

Figure 5:
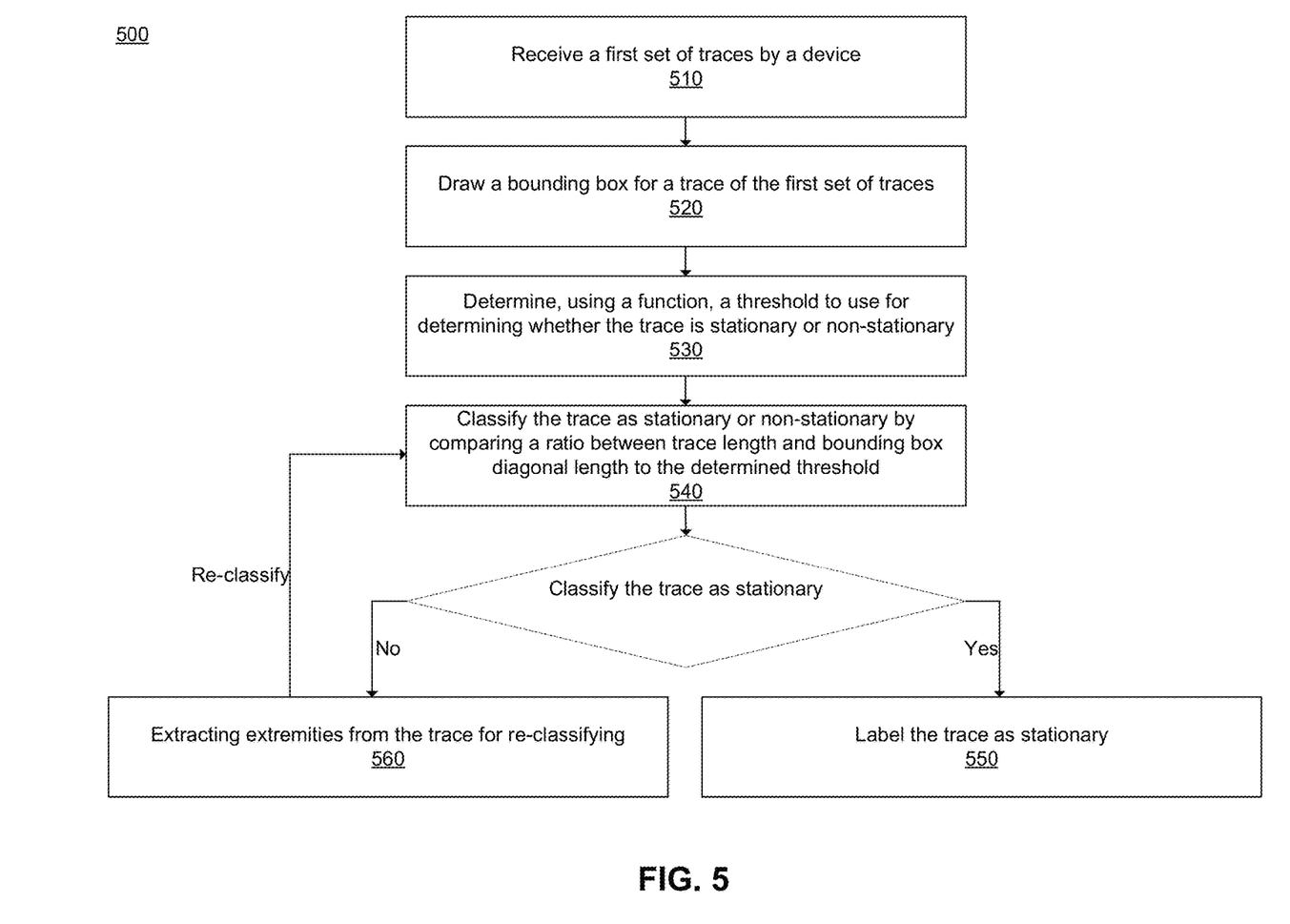
FIG. 5 shows a process for classifying a trace as stationary or non-stationary, in accordance with an embodiment.

FIG. 5 shows a process for classifying a trace as stationary or non-stationary, in accordance with an embodiment. Although the steps in FIG. 5 are shown in an order, the steps of FIG. 5 may be performed in any order, and are not limited to the order shown in the process 500. Additionally, some steps of the process 500 may be optional, may be performed multiple times, and/or may be performed by different components. All steps, operations and functions of a flow diagram that are described herein are intended to indicate operations that are performed using programming in a special-purpose computer or general-purpose computer, in various embodiments, at the same level of detail that is used by persons of ordinary skill in the art to which the disclosure pertains for communicating with one another about similar computer programs or algorithms. In other words, each flow diagram in this disclosure is a guide, plan or specification of an algorithm for programming a computer to execute the functions that are described.

The process 500 begins when the server computer receives 510 a first set of traces by a device. For example, the received first set of traces includes a plurality of traces, and each trace can include an origin and destination point linked by one or more intermediate points. In some embodiments, the client device transmits the entire trace at one time, however the trace may be received over a period of time or in real time as the trace data is collected by the client device. Additional traces of differing sizes may also be received from the same client device or another suitable client device. Each received trace can comprise metadata and location data associated with the position of the client device. For example, metadata received with a trace may include a device identifier, an application identifier (identifying the application run on the client device that provides the data set), and a vendor identifier. The location data associated with a received trace can comprise a set of multiple points, including an origin point, a destination point, and one or more intermediate points. As described above, each point may comprise latitude, longitude, and time stamp values and can be associated or connected to one or more other points in the trace. In some implementations, the origin and destination points of a received trace are associated with origin and destination of a complete trip made by the client device. However, in other embodiments a trip can be represented by multiple traces, each trace having a separate origin and destination point.

Then, the stationary classifier draws 520 a bounding box surrounding a trace of the first set of traces, the bounding box corresponding to endpoints of the trace. The endpoints of the trace may include the origin point and the destination point. The stationary classifier further determines the bounding box diagonal length.

The stationary classifier determines 530 a threshold to use for determining whether the trace is stationary or non-stationary. The threshold is determined using a custom sigmoid function of the bounding box diagonal length, for example, based on known stationary traces used to train the model. The bounding box diagonal length is provided to the custom sigmoid function as an input, and a threshold for prediction is output.

The stationary classifier classifies 540 the trace as stationary or non-stationary by comparing a ratio represented by the trace length divided by the bounding box diagonal length to the determined threshold. For example, the trace is classified as stationary if the ratio is less than the determined threshold, and non-stationary if the ratio is greater than or equal to the determined threshold. In some embodiments, the stationary classifier classifies the trace as stationary or non-stationary by comparing the trace length to the determined threshold.

If the stationary classifier classifies the trace as stationary, the trace is labeled 550 as stationary. If the stationary classifier classifies the trace as non-stationary, extremities are extracted 560 from the trace for re-classifying. An extremity is an outlier point of a trace that may affect the classification of the trace. For example, the stationary classifier overestimates the bounding box diagonal length for a trace containing an endpoint extremity that exceeds a radius from an intermediate point, and may incorrectly classify the trace as non-stationary. Therefore, extracting extremities from the trace allows the stationary classifier to more accurately classify traces. Extracting extremities includes checking if the trace is stationary or within a radius and has a low max speed. The radius may be measured from an intermediate point or any other suitable location within the boundary box of a trace. After the extremities are extracted, the stationary classifier re-classifies the trace as stationary or non-stationary.

Figure 6:
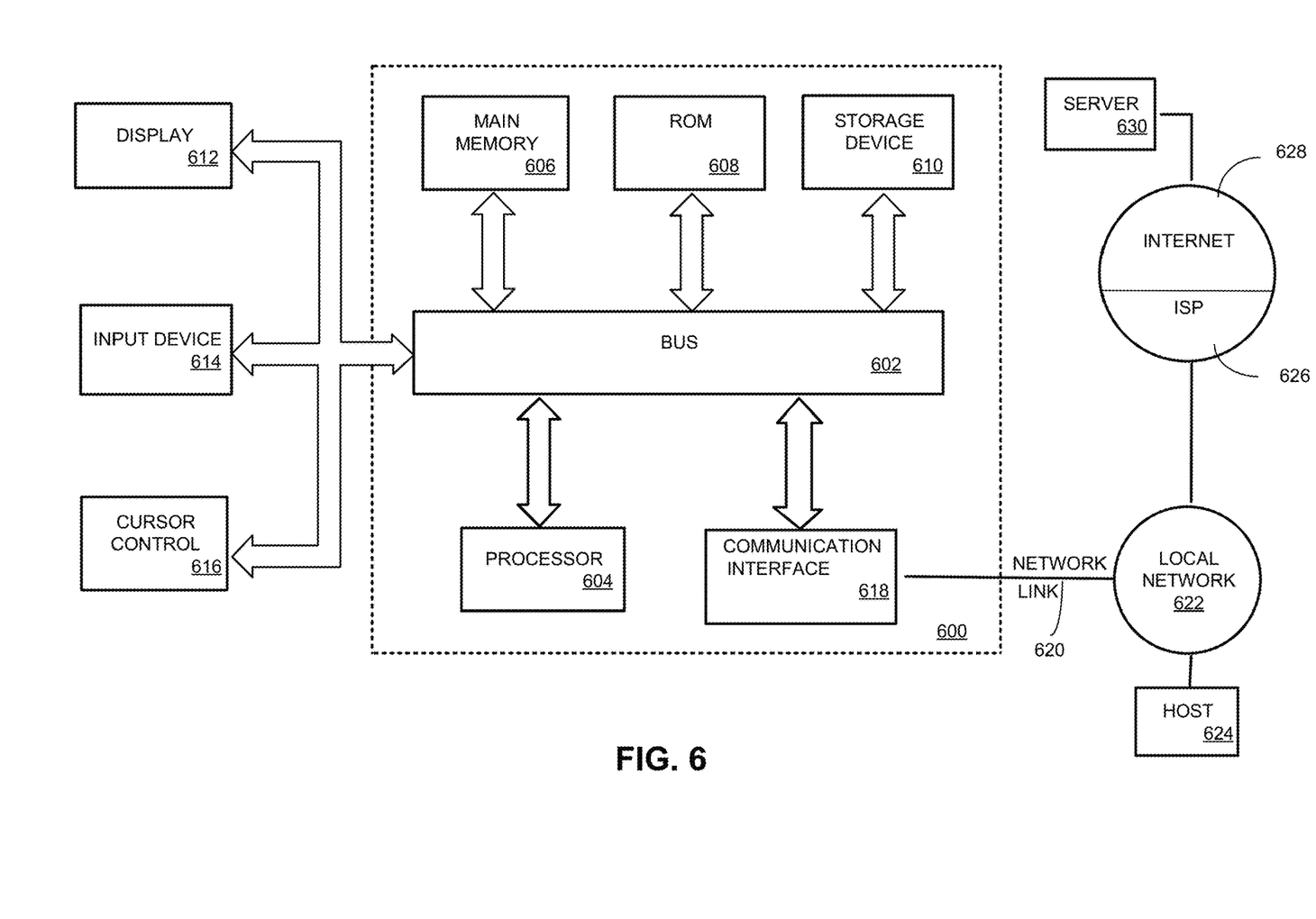
FIG. 6 illustrates a computer system upon which an embodiment may be implemented, in accordance with an embodiment.

FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a LCD screen, LED screen, or touch screen, for displaying information to a computer user. An input device 614, which may include alphanumeric and other keys, buttons, a mouse, a touchscreen, or other input elements is coupled to bus 602 for communicating information and command selections to processor 604. In some embodiments, the computer system 600 may also include a cursor control 616, such as a mouse, a trackball, or cursor direction keys for communicating direction information and command selections to processor 604 and for controlling cursor movement on display 612. The cursor control 616 typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic, radio, or light waves, such as those generated during radio-wave and infra-red data communications, such as WI-FI, 3G, 4G, BLUETOOTH, or wireless communications following any other wireless networking standard.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method for classifying activity of a device based upon data representing movement of the device, the method comprising:

receiving, by a device, a trace comprising a set of location data;

drawing a bounding box surrounding the trace, the bounding box corresponding to endpoints of the trace;

determining whether the trace is stationary by comparing a ratio between a length of the trace and a diagonal length of the drawn bounding box to a threshold value; and responsive to determining the trace is non-stationary, extracting extremities from the trace for re-classifying.

2. The method of claim 1, further comprising:

determining the threshold value using a classification function.

3. The method of claim 2, further comprising:

receiving, by the device, a second trace known to be stationary; and training the classification function using the second trace.

4. The method of claim 2, wherein the classification function is a sigmoid function of the diagonal length of the drawn bounding box.

5. The method of claim 2, wherein the classification function is modified by a set of factors comprising a geolocation factor.

6. The method of claim 1, wherein the trace is classified as non-stationary if the ratio is greater than or equal to the determined threshold.

7. The method of claim 1, wherein extracting extremities comprises identifying an outlier location data point in the set of location data that is beyond a threshold radius from an intermediate location data point in the set of location data.

8. The method of claim 1, wherein the bounding box is drawn between two of an origin location data point, an intermediate location data point, and a destination location data point of the set of location data.

9. The method of claim 1, wherein the bounding box is drawn between an origin location data point and a destination location data point of the set of location data.

10. The method of claim 1, further comprising:

selecting an origin section for the trace, the origin section comprising an origin location data point and one or more intermediate location data points of the set of location data;

removing the origin section from the set of location data;

selecting a destination section for the trace, the destination section comprising a destination location data point and one or more of the intermediate location data points;

removing the destination section from the trace; and dividing the trace into a plurality of subtraces, each subtrace comprising a plurality of consecutive intermediate location data points of the location data.

11. The method of claim 10, further comprising:

removing, from each subtrace of the plurality of subtraces, one or more intermediate location data points connecting the subtrace to one or more other subtraces of the plurality of subtraces; and storing each subtrace of the plurality of subtraces independently.

12. A non-transitory computer-readable storage medium storing computer program instructions executable by at least one processor, the computer program instructions comprising computer program instructions to:

receive, by a device, a trace comprising a set of location data;

draw a bounding box surrounding the trace, the bounding box corresponding to endpoints of the trace;

determine whether the trace is stationary by comparing a ratio between a length of the trace and a diagonal length of the drawn bounding box to a threshold value; and responsive to determining the trace is non-stationary, extract extremities from the trace for re-classifying.

13. The non-transitory computer-readable storage medium of claim 12, the computer program instructions further comprising computer program instructions to:

determine the threshold value using a classification function.

14. The non-transitory computer-readable storage medium of claim 13, the computer program instructions further comprising computer program instructions to:

receive, by the device, a second trace known to be stationary; and train the classification function using the second trace.

15. The non-transitory computer-readable storage medium of claim 13, wherein the classification function is a sigmoid function of the diagonal length of the drawn bounding box.

16. The non-transitory computer-readable storage medium of claim 13, wherein the classification function is modified by a set of factors comprising a geolocation factor.

17. The non-transitory computer-readable storage medium of claim 12, wherein the bounding box is drawn between two of an origin location data point, an intermediate location data point, and a destination location data point of the set of location data.

18. The non-transitory computer-readable storage medium of claim 12, the computer program instructions further comprising computer program instructions to:

select an origin section for the trace, the origin section comprising an origin location data point and one or more intermediate location data points of the set of location data;

remove the origin section from the set of location data;

select a destination section for the trace, the destination section comprising a destination location data point and one or more of the intermediate location data points;

remove the destination section from the trace; and divide the trace into a plurality of subtraces, each subtrace comprising a plurality of consecutive intermediate location data points of the location data.

19. The non-transitory computer-readable storage medium of claim 18, the computer program instructions further comprising computer program instructions to:

remove, from each subtrace of the plurality of subtraces, one or more intermediate location data points connecting the subtrace to one or more other subtraces of the plurality of subtraces; and store each subtrace of the plurality of subtraces independently.

* * * * *